United States Patent
Rydén et al.

(10) Patent No.: US 11,375,472 B2
(45) Date of Patent: Jun. 28, 2022

(54) REDUCED RADIO LINK FAILURE FOR AERIAL UE

(71) Applicant: Telefonaktiebolaget LM Ericsson (publ), Stockholm (SE)

(72) Inventors: Henrik Rydén, Solna (SE); Zhenhua Zou, Solna (SE); Xingqin Lin, Santa Clara, CA (US); Helka-Liina Määttanen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 36 days.

(21) Appl. No.: 17/253,036

(22) PCT Filed: Jun. 22, 2018

(86) PCT No.: PCT/IB2018/054635
§ 371 (c)(1),
(2) Date: Dec. 16, 2020

(87) PCT Pub. No.: WO2019/243879
PCT Pub. Date: Dec. 26, 2019

(65) Prior Publication Data
US 2021/0258909 A1    Aug. 19, 2021

(51) Int. Cl.
*H04W 60/04* (2009.01)
*H04W 76/19* (2018.01)
*H04W 84/06* (2009.01)

(52) U.S. Cl.
CPC ........... *H04W 60/04* (2013.01); *H04W 76/19* (2018.02); *H04W 84/06* (2013.01)

(58) Field of Classification Search
CPC ..... H04W 60/04; H04W 76/19; H04W 84/06; H04W 28/26; H04W 72/048; H04W 24/10; H04W 24/02; G08C 17/00
See application file for complete search history.

(56) References Cited

U.S. PATENT DOCUMENTS

| | | | |
|---|---|---|---|
| 9,537,561 B1 | 1/2017 | Kotecha et al. | |
| 2014/0155058 A1* | 6/2014 | Vikberg | H04W 24/02 455/423 |
| 2016/0300492 A1 | 10/2016 | Pasko et al. | |

FOREIGN PATENT DOCUMENTS

WO    2018019394 A1    2/2018

OTHER PUBLICATIONS

International Search Report and Written Opinion dated Oct. 12, 2018 for International Application No. PCT/IB2018/054635 filed on Jun. 22, 2018, consisting of 15-pages.
(Continued)

*Primary Examiner* — Ashley Shivers
(74) *Attorney, Agent, or Firm* — Christopher & Weisberg, P A

(57) ABSTRACT

According to some embodiments, a method in a wireless device for use in a radio network is provided. The method includes receiving network radio coverage information from a network element and determining a path of travel for the wireless device using the received network radio coverage information. In particular embodiments, the wireless device controls the wireless device to follow the determined path of travel. The wireless device may report radio coverage information to a network element. In particular embodiments, the network element receives a radio coverage report from a wireless device, determines network radio coverage information using the received radio coverage report, and sends the determined network radio coverage information to a wireless device. The wireless device may be an unmanned aerial vehicle.

19 Claims, 9 Drawing Sheets

500

512 - report radio coverage information to a network element

514 – receive network radio coverage information from a network element

516 – determine a path of travel for the wireless device using the received network radio coverage information 518 – control the wireless device to follow the determined path of travel

(56) References Cited

OTHER PUBLICATIONS

ETSI TS 136 300 V14.6.0; LTE; Evolved Universal Terrestrial Radio Access (E-UTRA) and Evolved Universal Terrestrial Radio Access Network (E-UTRAN); Overall description; Stage 2 (3GPP TS.36.300 version 14.6.0 Release 14); Apr. 2014; France, consisting of 349-pages.
3GPP TSG-RAN WG2 Meeting #101 bis R2-1805125; Title: Discussion on flight path information; Agenda Item: 9.18.3; Source: Huawei, HiSilicon, CMCC, Fraunhofer, Nokia, Nokia Shanghai Bell,Lenovo, Motorola Mobility, InterDigital, KDDI; Document for: Discussion; Date and Location: Apr. 16-20, 2018, Sanya, China, consisting of 4-pages.
ETSI TS 136 331 V14.6.2; LTE; Evolved Universal Terrestrial Radio Access (E-UTRA); Radio Resource Control (RRC); Protocol specification (3GPP TS.36.331 version 14.6.2 Release 14); Apr. 2018; France, consisting of 774-pages.

* cited by examiner

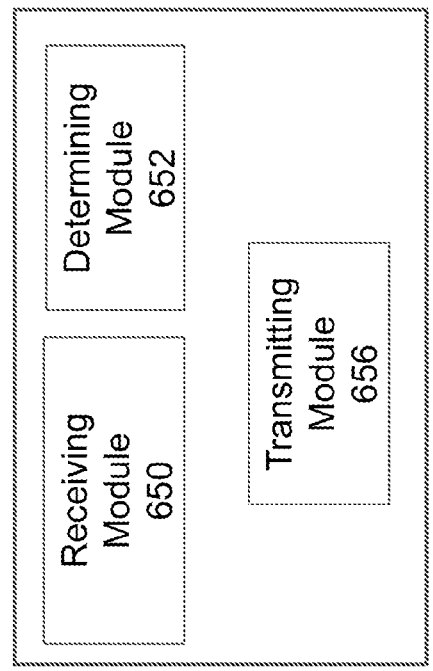
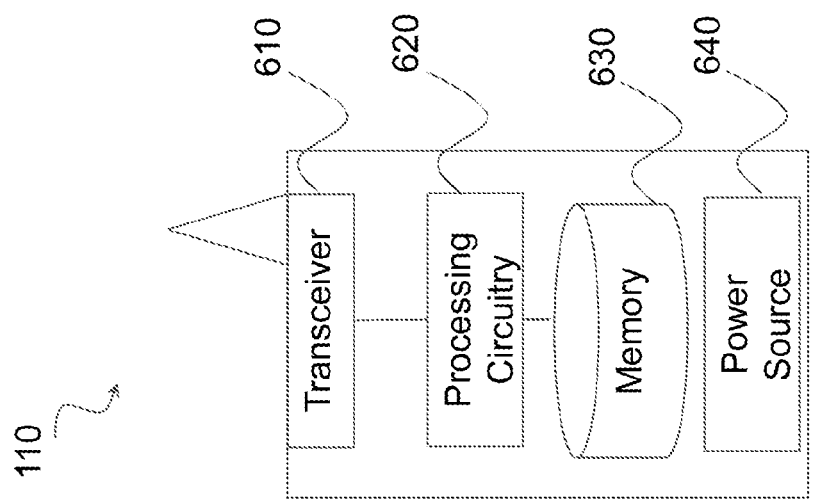

REDUCED RADIO LINK FAILURE FOR AERIAL UE

CROSS-REFERENCE TO RELATED APPLICATIONS

This application is a Submission Under 35 U.S.C. § 371 for U.S. National Stage Patent Application of International Application Number: PCT/IB2018/054635, filed Jun. 22, 2018 entitled "REDUCED RADIO LINK FAILURE FOR AERIAL UE," the entirety of which is incorporated herein by reference.

TECHNICAL FIELD

Particular embodiments are directed to wireless communications and, more particularly, to reducing radio link failure (RLF) for autonomous aerial user equipment (UEs).

BACKGROUND

The present disclosure is described within the context of Third Generation Partnership Project (3GPP) long term evolution (LTE) (i.e., enhanced universal terrestrial radio access network (E-UTRAN)). The problems and solutions described herein, however, are equally applicable to wireless access networks and user-equipment (UEs) implementing other access technologies and standards. LTE is used as an example technology where the solution is suitable. Using LTE in the description, therefore, is particularly useful for understanding the problems and solutions.

3GPP specifications include serving aerial vehicles using LTE network deployments with base station antennas targeting terrestrial coverage. Particular specifications are related to interference caused by drones (i.e., unmanned aerial vehicles (UAV)) using the LTE network (and mitigating interference) and performing handover between cells in the network.

An air-borne UE may experience radio propagation characteristics that are different than those experienced by a UE on or close to the ground. When an aerial vehicle is flying at a low altitude relative to a base station antenna height, the aerial vehicle behaves like a conventional UE. When the aerial vehicle is flying well above the base station antenna height, however, the uplink signal from the aerial vehicle becomes more visible to multiple cells because of line-of-sight propagation conditions.

The uplink signal from the aerial vehicle may increase interference in neighbor cells. The increased interference negatively impacts a conventional UE on or near the ground (e.g., smartphone, Internet-of-Things (IoT) device, etc.). Similarly, the line-of-sight propagation conditions to multiple cells results in higher downlink interference to the aerial UE.

Furthermore, because the base station antennas may be down tilted, while on the ground or below the base station height, the UE is likely served by the main lobe of the antennas. However, when the drone is flying above antenna boresight, the drone is likely served by the side lobes of the antennas. An example is illustrated in FIG. 1.

FIG. 1 is a schematic diagram illustrating an unmanned aerial vehicle flying above base station antenna height. UAV 10 is served by base station 20a. At a flying height above 200 feet, for example, UAV 10 may receive interference from base stations 20b or 20c, or may interfere with UEs served by base stations 20b or 20c.

The maps illustrated in FIGS. 2 and 3 illustrate that the coverage area of an eNB in the sky may be fragmented into several discontinuous areas, while the coverage area of an eNB on the ground is usually an approximate closed set. Also, an aerial UE may determine a cell further away as the best cell, whereas a terrestrial UE typically determines a closer cell is the best cell.

FIG. 2 is a radio coverage map illustrating the best serving sites as observed by an aerial UE at three different altitudes. Map A represents a UE at ground level. The coverage area around each eNB is approximately a closed set (i.e., a contiguous coverage area centered around each antennae). An airborne UE, however, may experience coverage areas fragmented into several discontinuous areas. Map B represents a UE at an altitude of 50 meters. At 50 meters, the coverage areas begin to fragment. Map C represents a UE at an altitude of 300 meters. At 300 meters the ripple effect is even more apparent.

FIG. 3 is a radio coverage map illustrating the signal to interference ratio (SIR) as observed by an aerial UE at three different altitudes. Map A represents a UE at ground level. The range of SIR is approximately 0 db (lightest areas) to 20 dB (darkest areas). As illustrated, the SIR is generally highest near the radio antenna and decreases with distance. Map B represents a UE at an altitude of 50 meters. The range of SIR at 30 meters is approximately 0 dB (lightest areas) to −0 dB (darkest areas). The SIR pattern is no longer dependent just on distance from the antenna. Map C represents a UE at an altitude of 300 meters, where the SIR range is approximately −5 (lightest areas) to −20 dB (darkest areas). As illustrated, the higher the UE, the lower the quality of the signal becomes.

Radio-link failure in LTE is detected and reported when a particular sequence of events occurs at a UE. The UE monitors the downlink link quality based on the cell-specific reference signal (CRS) and compares it to the thresholds Qout and Qin. LTE defines the threshold Qout as the level at which the downlink radio link cannot be reliably received and corresponds to 10% block error rate of a hypothetical physical downlink control channel (PDCCH) transmission taking into account the physical control format indicator channel (PCFICH) errors. LTE defines the threshold Qin as the level at which the downlink radio link quality can be significantly more reliably received than at Qout and corresponds to 2% block error rate of a hypothetical PDCCH transmission taking into account the PCFICH errors.

As defined in 3GPP TS 36.133, when the downlink radio link quality estimated over the last 200 ms period becomes worse than the threshold Qout, Layer 1 of the UE sends an out-of-synchronization (OOS) indication to the higher layers within a 200 ms Qout evaluation period. Similarly, when the downlink radio link quality estimated over the last 100 ms period becomes better than the threshold Qin, Layer 1 of the UE sends an in-sync indication to the higher layers within a 100 ms Qin evaluation period. In both cases, an L3 filter is applied to the indications as specified in 3GPP TS 36.331.

After a certain number of consecutive out-of-sync indications(OOS) ('N310' is the configurable value for OOS), the UE starts a network-configured radio link failure timer 'T310'. The timer is stopped if a number 'N311' of consecutive in-sync indications are reported by the UE's physical layer. Both the out-of-sync and in-sync counters (N310 and N311) are configurable by the network. Finally, upon timer T310 expiration, radio link failure (RLF) occurs.

The UE stores the latest RLF or handover failure related information, and indicates RLF report availability at each subsequent LTE radio resource control (RRC) connection (re)establishment and handover to an LTE cell until the RLF report is fetched by the network or for 48 hours after the RLF or handover failure is detected. The UE keeps the information during state transitions and radio access technology (RAT) changes, and indicates RLF report availability again after it returns to the LTE RAT.

The UE only indicates RLF report availability and only provides the RLF report to the network if the current registered public land mobile network (RPLMN) is a public land mobile network (PLMN) that was present in the UE's equivalent PLMN (EPLMN) list or was the RPLMN at the time the RLF or handover failure was detected.

TS36.331 specifies that "RLF-Report-r9" includes the information element "Location Info". The purpose is for coverage optimization in Section 22.4.5 of TS 36.300.

SUMMARY

The embodiments described herein include aerial vehicles, for example, that transmit assistant information, such as radio link failure (RLF) reports and/or reference signal received quality (RSRQ) reports, to a network node for computing radio coverage information. Particular embodiments include enhancements to report content and network node signaling of coverage information to the aerial vehicles.

The coverage information may be used for flight-path planning at the autonomous aerial user equipment (UE). The coverage information may comprise the maximum altitude below which coverage is guaranteed or a sequence of locations where there is no coverage, for example.

In general, the network may receive UE assistance information such as signal quality measurements and associated location estimates from a UE. Based on the received information, the network may estimate radio coverage of served locations and report the coverage information to UEs. A UE may adjust its travel path based on the received coverage information.

According to some embodiments, a method in a wireless device for use in a radio network comprises: receiving network radio coverage information from a network element and determining a path of travel for the wireless device using the received network radio coverage information. The method may further comprise controlling the wireless device to follow the determined path of travel.

Particular embodiments further comprise reporting radio coverage information to a network element. Reporting radio coverage information may comprise reporting a geographic path from when a radio link failure occurs to when the wireless device reconnects to the radio network. The reported geographic path may comprise a series of periodically sampled geographic location points. Reporting radio coverage information may comprise reporting one or more geographic locations where a received radio link quality is lower than a threshold quality, or periodically reporting a received radio link quality and associated geographic location information.

In particular embodiments, the network radio coverage information comprises a maximum altitude above which the wireless device should not include in the determined path of travel. The network radio coverage information may comprise one or more geographic locations where a radio link quality is below a threshold quality, or one or more geographic locations and associated radio link quality.

In particular embodiments, determining the path of travel comprises avoiding geographic locations with a radio link quality below a threshold quality. The wireless device may comprise an unmanned aerial vehicle.

According to some embodiments, a wireless device for use in a radio network comprises processing circuitry operable to receive network radio coverage information from a network element and determine a path of travel for the wireless device using the received network radio coverage information. The processing circuitry may be further operable to control the wireless device to follow the determined path of travel.

In particular embodiments, the processing circuitry is further operable to report radio coverage information to a network element, such as a network node or a server node. The processing circuitry may be operable to report radio coverage information by reporting a geographic path from when a radio link failure occurs to when the wireless device reconnects to the radio network. The reported geographic path may comprise a series of periodically sampled geographic location points. The processing circuitry may be operable to report radio coverage information by reporting one or more geographic locations where a received radio link quality is lower than a threshold quality. The processing circuitry may be operable to report radio coverage information by periodically reporting a received radio link quality and associated geographic location information.

In particular embodiments, the network radio coverage information comprises a maximum altitude above which the wireless device should not include in the determined path of travel. The network radio coverage information may comprise one or more geographic locations where a radio link quality is below a threshold quality, or one or more geographic locations and associated radio link quality.

In particular embodiments, the processing circuitry is operable to determine the path of travel by avoiding geographic locations with a radio link quality below a threshold quality. The wireless device may comprise an unmanned aerial vehicle.

According to some embodiments, a method in a network element for use in a radio network comprises receiving a first radio coverage report from a first wireless device, determining network radio coverage information using the received first radio coverage report, and sending the determined network radio coverage information to a wireless device. The method may further comprise receiving a second radio coverage report from a second wireless device and determine the network radio coverage information using the first radio report and the second radio report.

In particular embodiments, the first radio coverage report comprises a geographic path from a location where the first wireless device experiences a radio link failure to a location where the first wireless device reconnects to the radio network. The geographic path may comprise a series of periodically sampled geographic location points. The first radio coverage report may comprise one or more geographic locations where a received radio link quality for the first wireless device is lower than a threshold quality, or may comprise periodically receiving a received radio link quality and associated geographic location information for the first wireless device.

In particular embodiments, the determined network radio coverage information comprises a maximum altitude above which the wireless device should not include in a path of travel. The determined network radio coverage information may comprise one or more geographic locations where a radio link quality is below a threshold quality, or one or more geographic locations and associated radio link quality.

In particular embodiments, the method further comprises sending the determined network radio coverage information to an unmanned aircraft traffic management system.

According to some embodiments, a network element for use in a radio network comprises processing circuitry operable to receive a first radio coverage report from a first wireless device, determine network radio coverage information using the received first radio coverage report, and send the determined network radio coverage information to a wireless device. The processing circuitry may be further operable to receive a second radio coverage report from a second wireless device and the processing circuitry is operable to determine network radio coverage information using the first radio report and the second radio report.

In particular embodiments, the first radio coverage report comprises a geographic path from a location where the first wireless device experiences a radio link failure to a location where the first wireless device reconnects to the radio network. The geographic path may comprise a series of periodically sampled geographic location points. The first radio coverage report may comprise one or more geographic locations where a received radio link quality for the first wireless device is lower than a threshold quality. The processing circuitry may be operable to receive the first radio coverage report by periodically receiving a received radio link quality and associated geographic location information for the first wireless device.

In particular embodiments, the determined network radio coverage information comprises a maximum altitude above which the wireless device should not include in a path of travel, one or more geographic locations where a radio link quality is below a threshold quality, or one or more geographic locations and associated radio link quality.

In particular embodiments, the processing circuitry is further operable to send the determined network radio coverage information to an unmanned aircraft traffic management system.

According to some embodiments, a wireless device for use in a radio network comprises a receiving module and a determining module. The receiving module is operable to receive network radio coverage information from a network element. The determining module is operable to determine a path of travel for the wireless device using the received network radio coverage information.

According to some embodiments, a network element for use in a radio network comprises a receiving module, a determining module, and a transmitting module. The receiving module is operable to receive a first radio coverage report from a first wireless device. The determining module operable to determine network radio coverage information using the received first radio coverage report, and the transmitting module is operable to send the determined network radio coverage information to a wireless device.

Also disclosed is a computer program product. The computer program product comprises instructions stored on non-transient computer-readable media which, when executed by a processor, perform the steps of: receiving network radio coverage information from a network element and determining a path of travel for the wireless device using the received network radio coverage information. The method may further comprise controlling the wireless device to follow the determined path of travel.

Another computer program product comprises instructions stored on non-transient computer-readable media which, when executed by a processor, perform the steps of: receiving a first radio coverage report from a first wireless device, determining network radio coverage information using the received first radio coverage report, and sending the determined network radio coverage information to a wireless device. The method may further comprise receiving a second radio coverage report from a second wireless device and determine the network radio coverage information using the first radio report and the second radio report.

Certain embodiments of the present disclosure may provide one or more technical advantages. For example, particular embodiments reduce the number of RLFs for aerial devices that are able to choose between alternative paths. Reporting of coverage information may further enable drones to plan paths that optimize the received signal quality. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 7A is a block diagram illustrating an example embodiment of a wireless device;

FIG. 7B is a block diagram illustrating example components of a wireless device;

DETAILED DESCRIPTION

Figure 1:
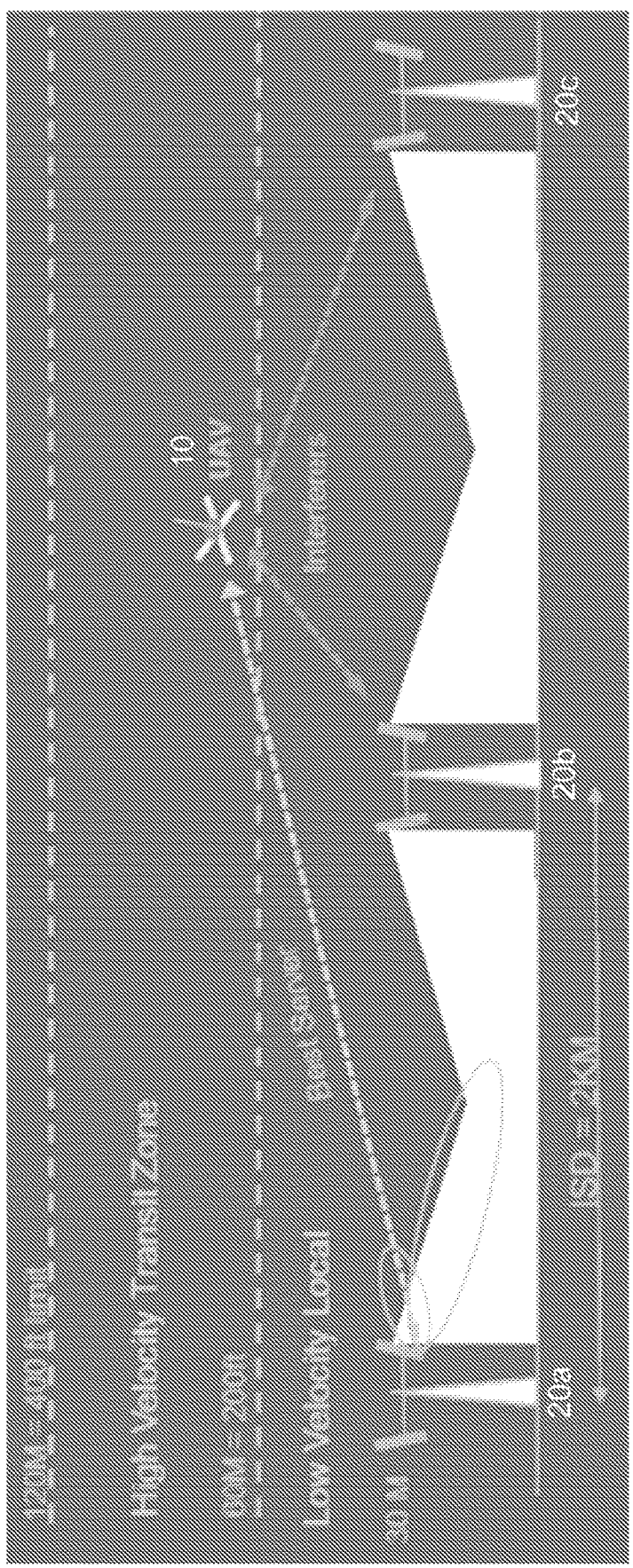
FIG. 1 is a schematic diagram illustrating an unmanned aerial vehicle flying above base station antenna height.
Figure 2:
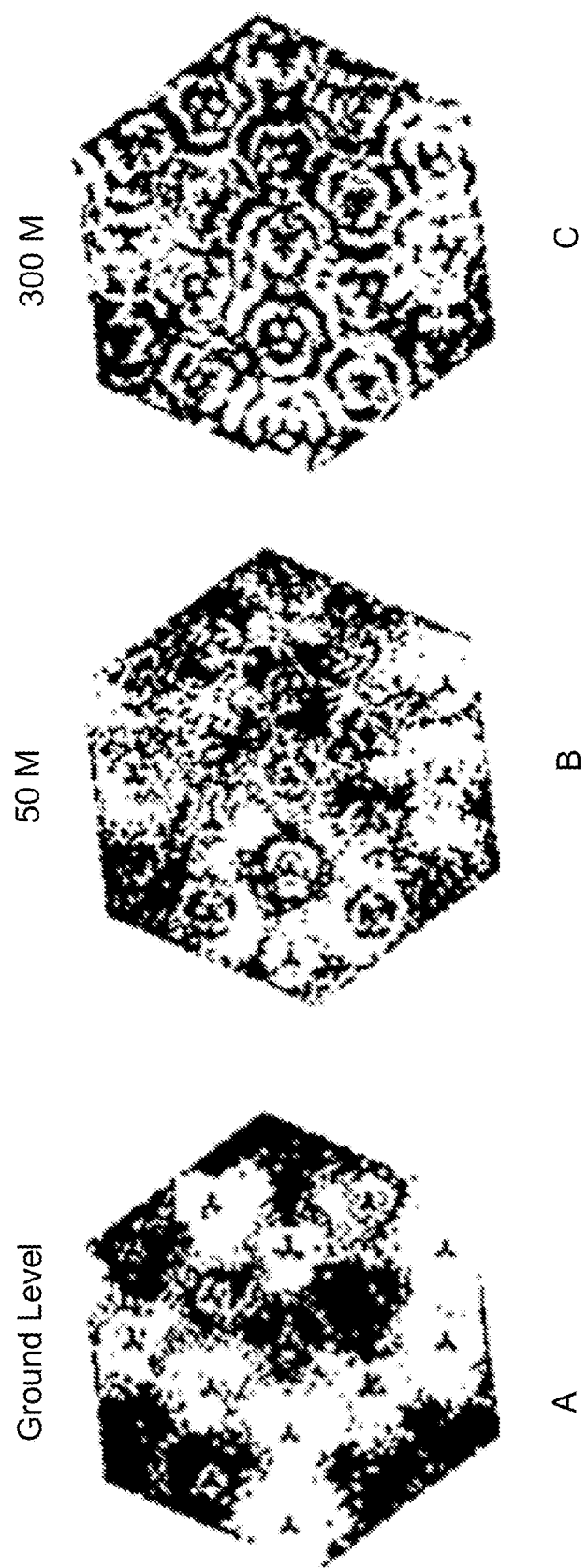
FIG. 2 includes three coverage maps illustrating the best serving site as seen by an aerial user equipment at three different altitudes.
Figure 3:
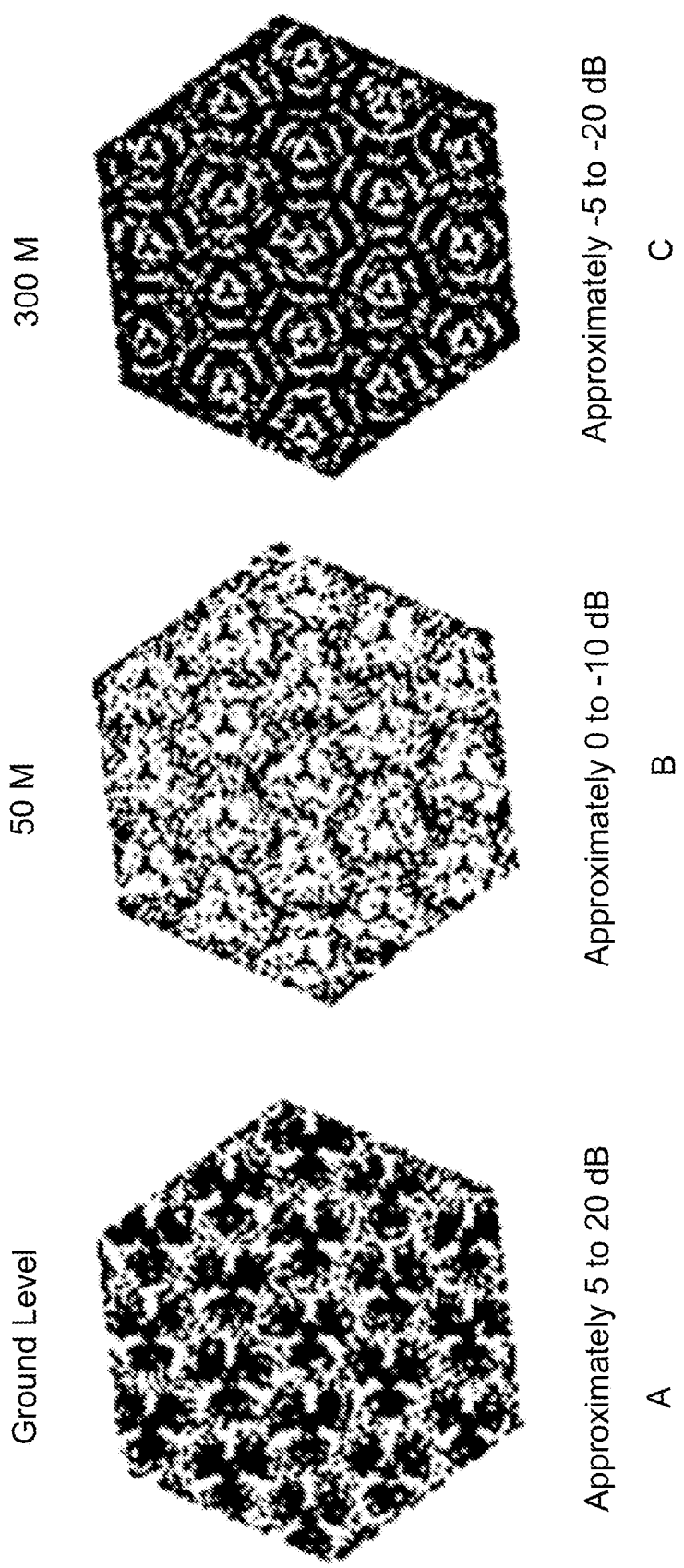
FIG. 3 includes three coverage maps illustrating the signal to interference geometry at three different altitudes.

The present disclosure is described within the context of Third Generation Partnership Project (3GPP) long term evolution (LTE), although problems and solutions described herein are equally applicable to wireless access networks and user-equipment (UE) implementing other access technologies and standards. 3GPP specifications include serving aerial vehicles using LTE network deployments with base station antennas targeting terrestrial coverage. Particular specifications are related to interference caused by unmanned aerial vehicles (UAVs) using the LTE network and performing handover between cells in the network. An objective of particular LTE specifications is to provide connectivity and positioning services to drones.

An air-borne UE may experience radio propagation characteristics that are different than those experienced by a UE on or close to the ground. When an aerial vehicle is flying at a low altitude relative to a base station antenna height, the aerial vehicle behaves like a conventional UE. When the aerial vehicle is flying well above the base station antenna height, however, the uplink signal from the aerial vehicle becomes more visible to multiple cells because of line-of-sight propagation conditions.

The uplink signal from the aerial vehicle may increase interference in neighbor cells. The increased interference negatively impacts a conventional UE on or near the ground (e.g., smartphone, Internet-of-Things (IoT) device, etc.). Furthermore, because the base station antennas may be down tilted, while on the ground or below the base station height, the UE is likely served by the main lobe of the antennas. However, when airborne the drone is likely served by the side lobes of the antennas.

Currently deployed mobile networks are tailored to support ground-level UEs. The flexible movement of aerial UEs challenges network design because it is difficult, if not impossible, to cover all possible three-dimensional locations in a network that may cover a few hundreds of meters. For example, signal quality decreases with the height of the UE, and above a certain altitude, the UEs will not have any coverage. The lack of sufficient coverage at altitude will increase the number of radio-link failures (RLF) for aerial UEs.

One method to reduce the number of RLFs is to adjust the antenna parameters based on the radio-link failure report. The radio-link failure report can include a location estimate at the point of failure, and the network can then adjust the antennas for enhanced coverage in the reported positions where RLFs occur. However, directing the antennas towards certain locations in the skies decreases the performance in other locations, especially where non-aerial UEs are located.

Particular embodiments obviate the problems described above and include aerial vehicles, for example, that transmit assistant information, such as RLF reports and/or reference signal received quality (RSRQ) reports, to a network node for computing radio coverage information. Particular embodiments include enhancements to report content and network node signaling of coverage information to the aerial vehicles.

The coverage information may be used for flight-path planning at the autonomous aerial UE. The coverage information may comprise the maximum altitude below which coverage is guaranteed or a sequence of locations where there is no coverage, for example.

An advantage is that particular embodiments reduce the number of RLFs for aerial devices that are able to choose between alternative paths. Reporting of coverage information may further enable aerial devices to plan paths that optimize their received signal quality.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-9B of the drawings, like numerals being used for like and corresponding parts of the various drawings. LTE and NR are used throughout this disclosure as an example cellular system, but the ideas presented herein may apply to other wireless communication systems as well.

Figure 4:
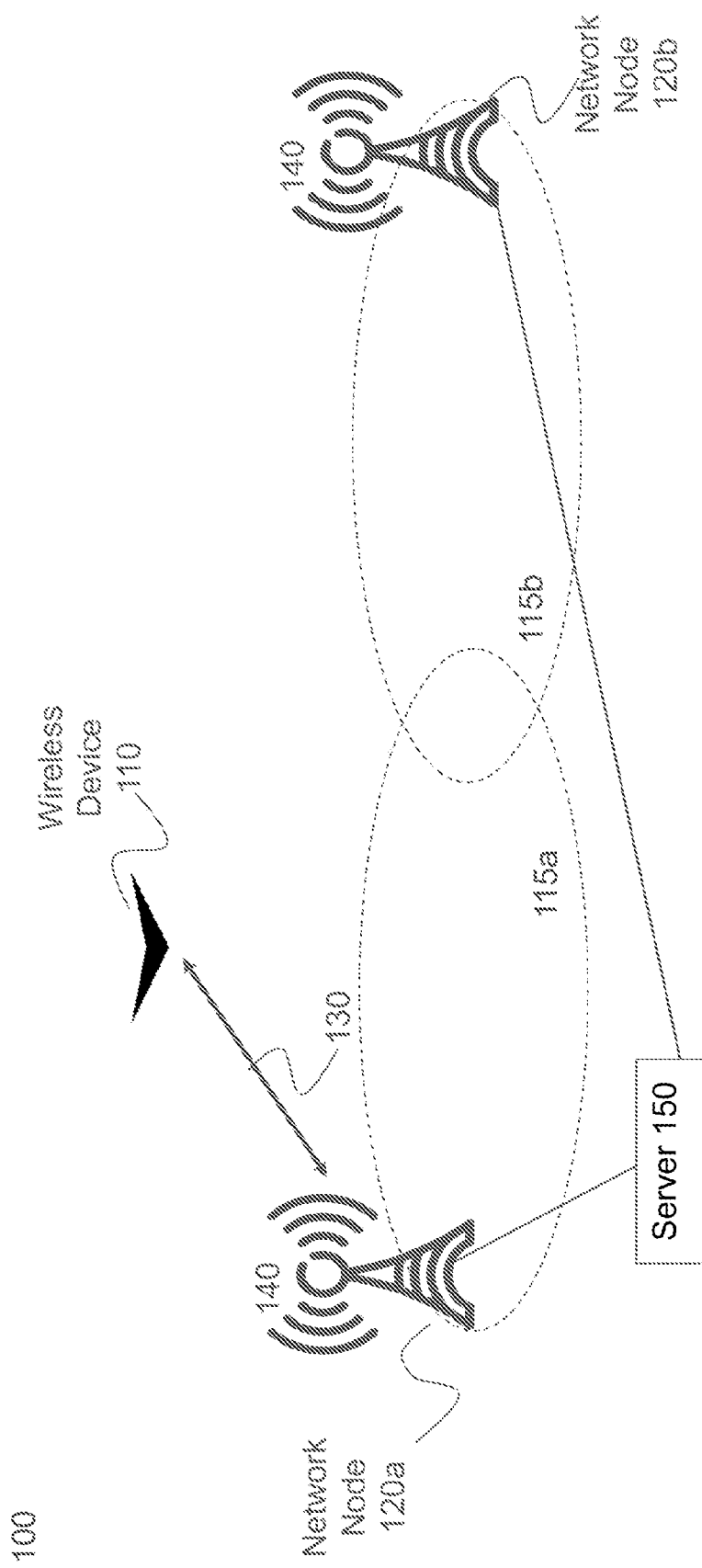
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). In particular embodiments, wireless device 110 may include an unmanned aerial vehicle (UAV). Wireless device 110 may also be referred to as a UE, as an aerial UE, an aerial device, etc. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

When wireless device 110 comprises a portion of a UAV, wireless device 110 may transmit and receive wireless signals 130 from a position above network node 120. The uplink signal from the aerial vehicle may be visible to cells 115a and 115b. The UAV is likely served by the side lobes of network nodes 120a or 120b.

Network 100 may include server 150. In certain embodiments, server 150 may interface with the other components of network 100 (e.g., wireless device 110, network node 120, etc.) via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Server 150 may comprise, for example, an unmanned aircraft system traffic management (UTM) system. Server 150 may include a database for collecting coverage maps, such as two-dimensional or three-dimensional coverage maps, from multiple mobile networks and/or other networks (e.g., satellite networks). Server 150 includes a communication interface where, for example, wireless devices 110 may query the database to obtain coverage information.

According to some embodiments, wireless device 110 receives network radio coverage information from a network element (e.g., network node 120, server 150, etc.) and determines a path of travel (e.g., to optimize coverage along the path, to minimize chances of losing coverage, etc.) using the received network radio coverage information. Wireless device 110 may be operable to control the wireless device to follow the determined path of travel.

In particular embodiments, wireless device 110 reports radio coverage information to a network element, such as network node 120 or server 150. The report may include a geographic path from when a RLF occurs to when wireless device 110 reconnects to network node 120. Thus, the path describes an area where the wireless device 110 did not have a suitable connection to network node 120. The reported geographic path may comprise, for example, a series of periodically sampled geographic location points (e.g., global positioning system (GPS) coordinates, a Cartesian coordinate system, ellipsoid point definition in 3GPP TS 23.032, or any other suitable description of a geographic locations and/or altitude). Some embodiments may include vectors or any other suitable description of a path of travel.

In some embodiments, wireless device 110 reports one or more geographic locations where a received radio link quality is lower than a threshold quality. As another example, wireless device 110 may periodically report a received radio link quality and associated geographic location information.

The different reporting methods may vary in the amount of signaling information and coverage information for each. For example, periodically reporting location and radio link quality, regardless of whether the radio link quality is good or bad, may result in a detailed coverage map, but includes a significant amount of signaling. Only reporting radio link failures may use less signaling but may not result in as detailed a coverage map as other reporting methods.

In particular embodiments, the network radio coverage information comprises a maximum altitude above which wireless device 110 should not include in its path of travel. In other examples, the network radio coverage information may comprise one or more geographic locations where a radio link quality is below a threshold quality, or one or more geographic locations and an associated radio link quality for the location. The amount of detail in the coverage information may depend on the processing ability wireless device 110. A simple device may rely on maximum altitude information to determine path. A more complex device may use a detailed coverage map with dense location and signal quality information.

In particular embodiments, wireless device 110 determines its path of travel by avoiding geographic locations with a radio link quality below a threshold quality. In particular embodiments a geographic location also includes altitude information.

According to some embodiments, a network element, such as network node 120, server 150, or both, receive a radio coverage report from wireless device 110. The network element may determine network radio coverage information using the received radio coverage report.

The network element may determine the radio coverage information by combining the information from the coverage report with information from coverage reports from other wireless devices 110 in the network. The network element may send the determined network radio coverage information to wireless device 110.

In some embodiments, wireless device 110 may include or be included in a UAV. The UAV may comprise an airframe body coupled to flight components, such as one or more propellers coupled to one or motors for providing lift and steering control. The motors may be coupled to one or more power supplies (e.g., battery, liquid fuel, etc.).

The airframe body may also be coupled to one or more mechanical and/or electronic controllers. The controllers may control flight characteristics, such as the speed and angle of the motors and propellers. The controllers may also provide navigational control. While general components of a UAV are described herein, particular embodiments may include more, less, or different components, and may comprise any suitable aerial vehicle.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below. In particular embodiments, a server such as server 150 may include the components described with respect to FIG. 9A below.

Particular embodiments include facilitating a UE, such as an unmanned aerial vehicle (UAV), to change its travel-path based on coverage information signalled from the network. The coverage information may be computed at a network element using assistance information received from one or more UE. Particular embodiments are not limited to aerial UEs, but any UE with the ability to alter its movement, such as connected self-driving cars.

In some embodiments, the assistance information is sent from a UE to the network in the Uu interface to a network node, such as network node 120. In some embodiments, the assistance information is sent from the UE to the network in an application PDU to a server node at UTM, such as server 150. Similarly, the coverage information may be sent by Uu interface from the network node or from the server node in application data to the UE. The network node (e.g., eNB, gNB, etc.), or a server node at UTM may be referred to generally as a network element.

Particular embodiments include UE assistance information sent from a UE to a network element. UE assistance information reports from UEs are used to estimate the radio coverage at locations served by a network node.

Some embodiments include enhanced RLF reports. For example, in addition to the information specified in an LTE RLF report as described in 3GPP TS 336.133, the following information may be included.

In particular embodiments, the report includes a path the UE travels from the time a radio-link failure occurs to the time when the UE is reconnected to the network. The path may be represented by a periodically sampled location points or be represented by a series of location points in which the distance (e.g., Euclidean distance) between any points is larger than a threshold.

In some embodiments, the report comprises one or more locations where the UE was out-of-synchronization (i.e., when the downlink radio link quality estimated over the last 200 ms period becomes worse than the threshold Qout). The Qout value may correspond to x % (where x is not necessarily equal to 10) block error rate of a hypothetical PDCCH transmission, and x may be a network configurable parameter or fixed to another value than 10%.

In some embodiments, the report includes a location of the UE when a t310 timer is started, which corresponds to a configured number of OOS incidents such as N310 in 3GPP TS 38.331.

Particular embodiments include enhanced triggering/reporting conditions for reporting coverage information. For example, in some embodiments a network element may estimate radio coverage by requesting UEs, such as aerial devices, to periodically report information about received signal strength and location. The location may, for example, be signaled via location positioning protocol (LPP), and the signal strength may correspond to the UE reported reference signal received power (RSRP), reference signal received quality (RSRQ), received signal strength indicator (RSSI), or any other suitable measurement.

In some embodiments, a UE sends RLF report/location information/measurement results, or any combination of those, when OOS occurs, or when a configurable number, such as N310 or another value, of OOS occurs.

According to some embodiments, coverage information is computed at a network element, where assistance information received from multiple UEs at various times enables the network to build a database of poor network coverage regions (or good coverage regions, or any other suitable coverage attribute). The coverage information may be sent to a UE. The content of the coverage information may vary in particular embodiments. The particular content includes a trade-off between signaling overhead and providing enough information for the autonomous drones to adapt their flight paths.

In some embodiments, the coverage information comprises coverage holes (i.e., a geographic area with signal strength and/or low signal quality under a threshold (possibly because of high downlink interferences) where the UE cannot maintain any or acceptable network connection). As one example, the coverage holes can be where an out-of-synchronization indication (or a modified OOS indication as described above) has been reported by all UEs (or a subset of one or more UEs).

In some embodiments, the reported coverage information comprises a single altitude value above which the aerial UE should refrain from flying. The altitude may be determined, for example, by an average height or a minimum height of the assistance information reports. In some embodiments, instead of a binary coverage hole map, where binary means locations with signal quality either above or below a threshold (1 or 0), the coverage information comprises a signal quality range. The signal quality in each location may be based, for example, on the RSRP, RSSI, RSRQ measurements. For multiple signal quality reports for the same location, the network may use an average of the reported signal quality reports for that location, or a maximum value, minimum value, or other processing methods. The location may be specified as an earth-bounded coordinate, for example using the ellipsoid point definition in 3GPP TS 23.032, or as an ellipsoid point with an uncertainty, where the uncertainty includes the two-dimensional or three-dimensional area where the signal quality metric is valid.

In particular embodiments, the network estimates the signal strengths and/or locations based on UE transmitted uplink reference signals.

Particular embodiments include computation of the coverage information. In some embodiments the signal quality report and coverage information are sent by higher-layer application data, and the eNB/gNB may be transparent to such transfer. In such embodiments, the computation may be performed at a central node. For example, an unmanned aircraft traffic management (UTM) system may include a central database that collects three-dimensional coverage maps from multiple mobile networks and/or other networks (e.g., satellite systems). Aerial UEs may query the central database to obtain partial or complete coverage information.

Particular embodiments include flight path adaptation. For example, in some embodiments the device uses the received coverage estimation to plan or change its flight path. For example, if the aerial device receives a maximum height for coverage, the aerial device tries not to exceed the height limit during its flight. An aerial UE may use the coverage information to plan a route so that the device receives optimal signal strengths or satisfactory signal quality along the route, or a certain metric-optimal (e.g., energy consumption optimal) route with a guaranteed signal quality along the route.

Particular embodiments may include methods in a wireless device and a network element. The examples and embodiments described above may be generally represented by the flowcharts in FIGS. 5 and 6.

Figure 5:
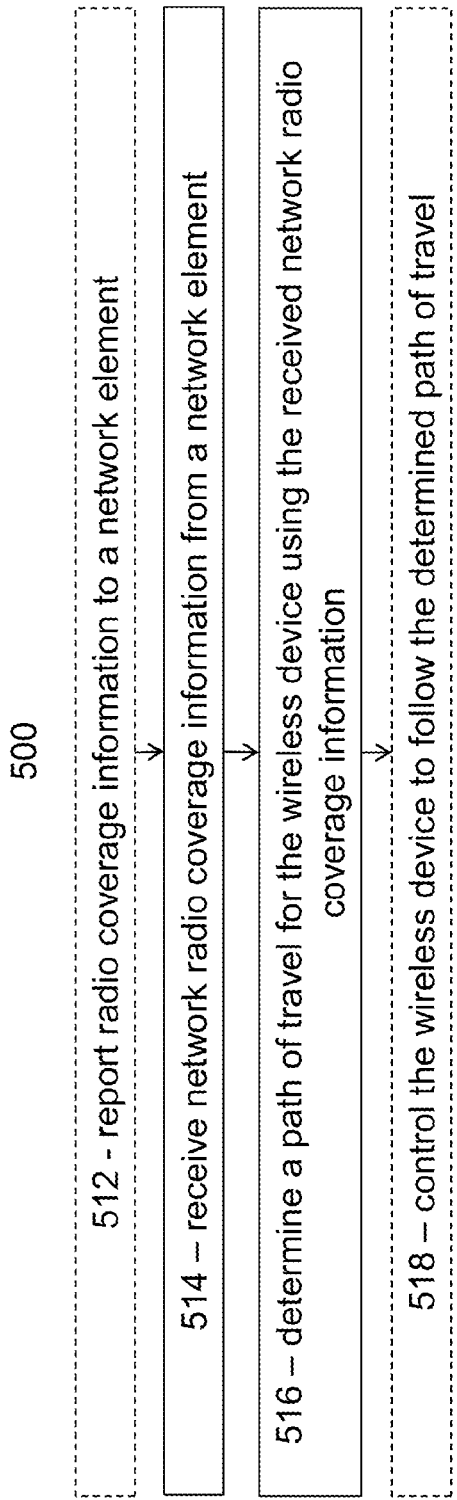
FIG. 5 is a flowchart of an example method in a wireless device, according to some embodiments.

FIG. 5 is a flow diagram illustrating an example method in a wireless device, according to some embodiments. In particular embodiments, one or more steps of FIG. 5 may be performed by wireless device 110 described with respect to FIG. 4.

The method may begin at step 512, where the wireless report radio coverage information to a network element. For example, wireless device 110 may report coverage information to network node 120, or to server 150 via network node 120. Wireless device 100 may report a geographic path from when a radio link failure occurs to when wireless device 110 reconnects to the radio network. The reported geographic path may comprise a series of periodically sampled geographic location points.

In particular embodiments, the wireless device may report one or more geographic locations where a received radio link quality is lower than a threshold quality. In some embodiments, the wireless device may not use a threshold. The wireless device may periodically report a received radio link quality and associated geographic location information.

The network element may use the reported radio link information from the wireless device, and any other wireless devices in the network, to determine network radio coverage information (e.g., areas of good or bad radio coverage within a geographical area served by the radio network).

At step 514, the wireless device receives network radio coverage information from a network element. For example, wireless device 110 may receive network radio coverage information from network node 120, or from server 150 via network node 120.

In particular embodiments, the network radio coverage information comprises a maximum altitude above which the wireless device should not include in the determined path of travel. For example, the network radio coverage information may indicate that the wireless device should not exceed 100 meters or risk losing network connectivity. The network radio coverage information may comprise one or more geographic locations where a radio link quality is below a threshold quality, or one or more geographic locations and associated radio link quality. The amount of detail of the coverage information may depend on the wireless device's ability to process the information. For example, a simple device may rely solely on altitude information. A more intelligent UE may benefit from a complete coverage map with measured signal levels for many locations within the network. In some embodiments the network radio coverage information may include a suggested travel path (the intelligence for determining a travel path may be shifted from the wireless device to the network element).

At step 516, the wireless device determines a path of travel using the received network radio coverage information. For example, wireless device 110 may compute a path to avoid areas with poor radio signal quality, or any based on any other suitable criteria, such as optimizing battery usage, etc. In embodiments where the network radio coverage information includes a suggested travel path. The wireless device may determine whether to accept or modify the suggested travel path. Wireless device 110 may determine or modify a travel path according to any of the embodiments or examples described above.

At step 518, the wireless device may control the wireless device to follow the determined path of travel. For example, wireless device 110 may comprise part of an unmanned aerial vehicle and wireless device 110 may include controls for flying the aerial vehicle according to particular travel path.

In other embodiments, the wireless device may not directly control the travel path. For example, wireless device 110 may display the travel path to a pilot or driver (in-vehicle, remote controlling, etc.), and the pilot or driver is responsible for navigating a vehicle according to the determined path of travel.

Modifications, additions, or omissions may be made to method 500. Additionally, one or more steps in method 500 of FIG. 5 may be performed in parallel or in any suitable order. The steps of method 500 may be repeated over time as necessary.

Figure 6:
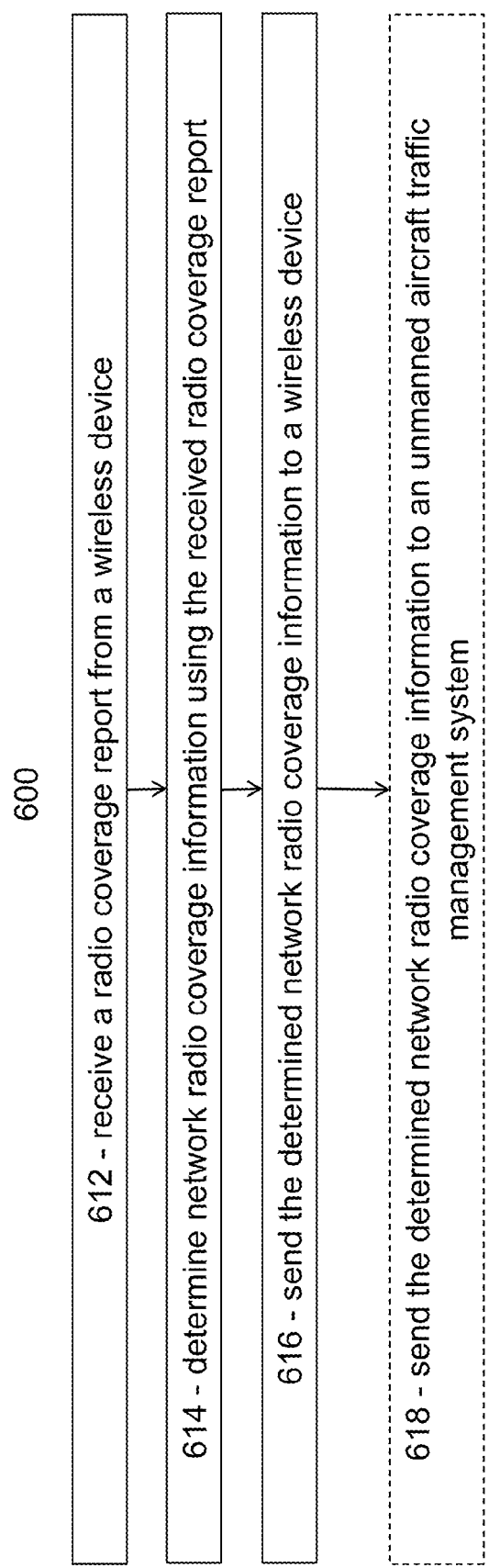
FIG. 6 is a flow diagram illustrating an example method in a network node, according to some embodiments.

FIG. 6 is a flow diagram illustrating an example method in a network element, according to some embodiments. In particular embodiments, one or more steps of FIG. 6 may be performed by network node 120 or server 150 described with respect to FIG. 4.

The method begins at step 612, where a network node receives a radio coverage report from a wireless device. For example, network node 120 may receive a radio coverage report from wireless device 110. The radio coverage report is described in more detail with respect to step 512 of FIG. 5.

At step 614, the network element determines network radio coverage information using the received radio coverage report. For example, network node 120 may use the received radio coverage information, alone or in combination with previous or concurrent radio coverage reports from the same or another wireless device to determine network radio coverage information (e.g., poor network coverage regions, good coverage regions, or any other suitable coverage attribute).

In particular embodiments, the coverage information comprises coverage holes, such as where an out-of-synchronization indication (or a modified OOS indication as described above) has been reported by all UEs (or a subset of one or more UEs). In some embodiments, the coverage information comprises a single altitude value above which the aerial UE should refrain from flying. The altitude may be determined, for example, by an average height or a minimum height of the received radio coverage reports. In some embodiments, the coverage information comprises a signal quality range (e.g., based on RSRP, RSSI, RSRQ measurements). For multiple signal quality reports for the same location, the network may use an average of the reported signal quality reports for that location, or a maximum value, minimum value, or other processing methods. The location may be specified as an earth-bounded coordinate, for example using the ellipsoid point definition in 3GPP TS 23.032, or as an ellipsoid point with an uncertainty, where the uncertainty includes the two-dimensional or three-dimensional area where the signal quality metric is valid.

At step 616, the network element sends the determined network radio coverage information to a wireless device. For example, network node 120 may send the determined radio coverage information to any one or more wireless devices 110 in network 100. The wireless device may be the same or different wireless device from step 612. In some embodiments, server 150 may determine the network radio coverage information and send it to wireless device 110 via network node 120.

At step 618, the network element may send the determined network radio coverage information to a UTM system. For example, network node 120 may send the determined network radio coverage information to server 150. The UTM may combine the coverage information with coverage information from other network nodes.

Modifications, additions, or omissions may be made to method 600. Additionally, one or more steps in method 600 of FIG. 6 may be performed in parallel or in any suitable order. The steps of method 600 may be repeated over time as necessary.

FIG. 7A is a block diagram illustrating an example embodiment of a wireless device. The wireless device is an example of the wireless devices 110 illustrated in FIG. 4. In particular embodiments, the wireless device is capable of receiving network radio coverage information from a network element and determining a path of travel for the wireless device using the received network radio coverage information. The wireless device may be capable of reporting radio coverage information to a network element and/or controlling the wireless device to follow the determined path of travel. The wireless device may comprise an unmanned aerial vehicle (AEV).

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 610, processing circuitry 620, memory 630, and power source 640. In some embodiments, transceiver 610 facilitates transmitting wireless signals to and receiving wireless signals from wireless network node 120

(e.g., via an antenna), processing circuitry 620 executes instructions to provide some or all of the functionality described herein as provided by the wireless device, and memory 630 stores the instructions executed by processing circuitry 620. Power source 640 supplies electrical power to one or more of the components of wireless device 110, such as transceiver 610, processing circuitry 620, and/or memory 630.

Processing circuitry 620 includes any suitable combination of hardware and software implemented in one or more integrated circuits or modules to execute instructions and manipulate data to perform some or all of the described functions of the wireless device. In some embodiments, processing circuitry 620 may include, for example, one or more computers, one more programmable logic devices, one or more central processing units (CPUs), one or more microprocessors, one or more applications, and/or other logic, and/or any suitable combination of the preceding. Processing circuitry 620 may include analog and/or digital circuitry configured to perform some or all of the described functions of wireless device 110. For example, processing circuitry 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 640 is generally operable to supply electrical power to the components of wireless device 110. Power source 640 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

FIG. 7B is a block diagram illustrating example components of a wireless device 110. The components may include receiving module 650, determining module 652, and transmitting module 656.

Receiving module 650 may perform the receiving functions of wireless device 110. For example, receiving module 650 may receive radio network coverage information according to any of the examples or embodiments described above (e.g., step 514 of FIG. 5). In certain embodiments, receiving module 650 may include or be included in processing circuitry 620. In particular embodiments, receiving module 650 may communicate with determining module 652 and transmitting module 656.

Determining module 652 may perform the determining functions of wireless device 110. For example, determining module 652 may determine a path of travel for the wireless device and/or control the wireless device to follow the determined path based on any of the embodiments or examples described above (e.g., steps 516 and 518 of FIG. 5). In certain embodiments, determining module 652 may include or be included in processing circuitry 620. In particular embodiments, determining module 652 may communicate with receiving module 650 and transmitting module 656.

Transmitting module 656 may perform the transmitting functions of wireless device 110. For example, transmitting module 656 may transmit radio coverage information to a network element according to any of the examples or embodiments described above (e.g., step 512 of FIG. 5). In certain embodiments, transmitting module 656 may include or be included in processing circuitry 620. In particular embodiments, transmitting module 656 may communicate with receiving module 650 and determining module 652.

Figure 8B:
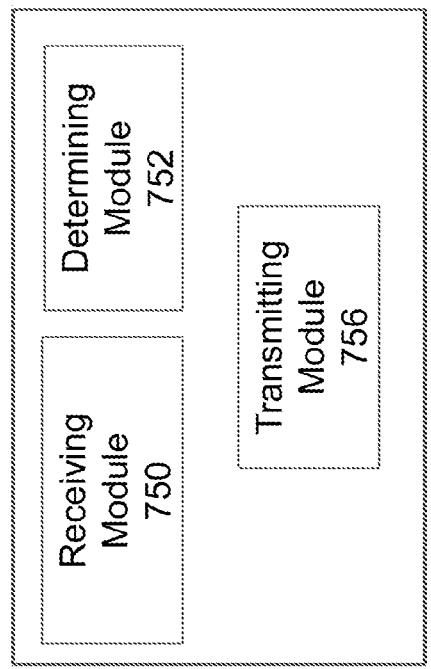
FIG. 8B is a block diagram illustrating example components of a network node.
Figure 8A:
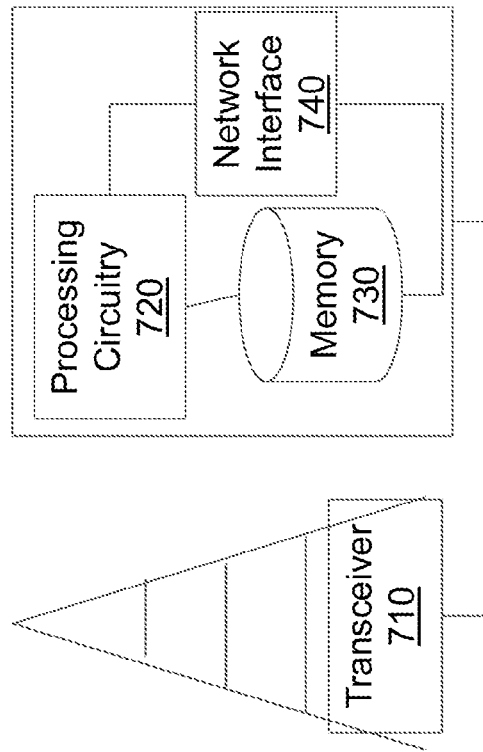
FIG. 8A is a block diagram illustrating an example embodiment of a network node.

FIG. 8A is a block diagram illustrating an example embodiment of a network node. The network node is an example of the network node 120 illustrated in FIG. 4. In particular embodiments, the network node is capable of receiving a radio coverage report from a wireless device, determining network radio coverage information using the received radio coverage report, and sending the determined network radio coverage information to a wireless device.

Network node 120 can be an eNodeB, a nodeB, gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 710, processing circuitry 720, at least one memory 730, and at least one network interface 740. Transceiver 710 facilitates transmitting wireless signals to and receiving wireless signals from a wireless device, such as wireless devices 110 (e.g., via an antenna); processing circuitry 720 executes instructions to provide some or all of the functionality described above as being provided by a network node 120; memory 730 stores the instructions executed by processing circuitry 720; and network interface 740 communicates signals to backend network components, such as a gateway, switch, router, Internet, Public Switched Telephone Network (PSTN), controller, and/or other network nodes 120. Processing circuitry 720 and memory 730 can be of the same types as described with respect to processing circuitry 620 and memory 630 of FIG. 7A above.

In some embodiments, network interface 740 is communicatively coupled to processing circuitry 720 and refers to any suitable device operable to receive input for network node 120, send output from network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of network node 120 include additional components (beyond those shown in FIG. 8A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 8B is a block diagram illustrating example components of a network node 120. The components may include receiving module 750, determining module 752, and transmitting module 756.

Receiving module 750 may perform the receiving functions of network node 120. For example, receiving module 750 may receive a radio coverage report from a wireless device according to any of the examples or embodiments described above (e.g., step 612 of FIG. 6). In certain embodiments, receiving module 750 may include or be included in processing circuitry 720. In particular embodiments, receiving module 750 may communicate with determining module 752 and transmitting module 756.

Determining module 752 may perform the determining functions of network node 120. For example, determining module 752 may determine network radio coverage information using the received radio coverage report according to any of the embodiments or examples described above (e.g., step 614 of FIG. 6). In certain embodiments, determining module 752 may include or be included in processing circuitry 720. In particular embodiments, determining module 752 may communicate with receiving module 750 and transmitting module 756.

Transmitting module 756 may perform the transmitting functions of network node 120. For example, transmitting module 756 may transmit the determined network radio coverage information to a wireless device or a server node according to any of the examples or embodiments described above (e.g., steps 616 and 618 of FIG. 6). In certain embodiments, transmitting module 756 may include or be included in processing circuitry 720. In particular embodiments, transmitting module 756 may communicate with receiving module 750 and determining module 752.

Figure 9B:
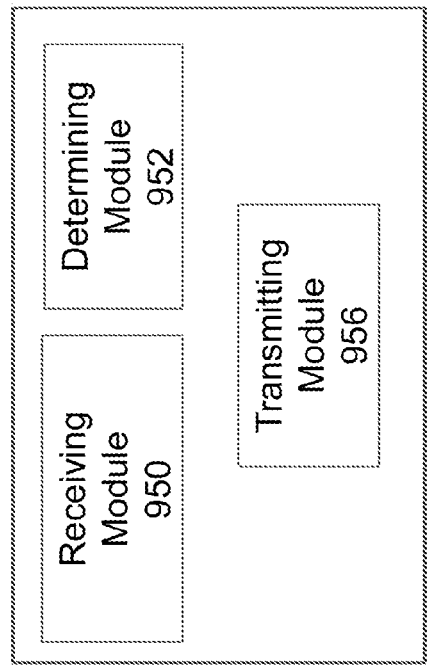
FIG. 9B is a block diagram illustrating example components of a network server.
Figure 9A:
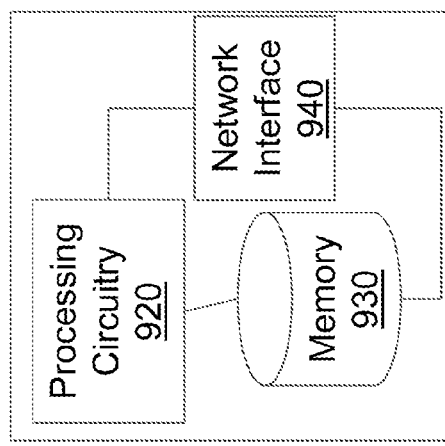
FIG. 9A is a block diagram illustrating an example embodiment of a network server.

FIG. 9A is a block diagram illustrating an example embodiment of a server. The server is an example of server 150 illustrated in FIG. 4. In particular embodiments, the server is capable of receiving a radio coverage report from a wireless device, determining network radio coverage information using the received radio coverage report, and sending the determined network radio coverage information to a wireless device.

The server includes processing circuitry 920, at least one memory 930, and at least one network interface 940. In some embodiments, processing circuitry 920 executes instructions to provide some or all of the functionality described herein as provided by the server. Memory 930 stores the instructions executed by processing circuitry 920. Network interface 940 communicates signals to other network components, such as a gateway, switch, router, Internet, Public Switched Telephone Network (PSTN), controller, network nodes 12, and other servers 150.

Processing circuitry 920 includes any suitable combination of hardware and software implemented in one or more integrated circuits or modules to execute instructions and manipulate data to perform some or all of the described functions of the server. In some embodiments, processing circuitry 920 may include, for example, one or more computers, one more programmable logic devices, one or more central processing units (CPUs), one or more microprocessors, one or more applications, and/or other logic, and/or any suitable combination of the preceding. Processing circuitry 920 may include analog and/or digital circuitry configured to perform some or all of the described functions of server 150. For example, processing circuitry 920 may include resistors, capacitors, inductors, transistors, diodes, and/or any other suitable circuit components.

Memory 930 is generally operable to store computer executable code and data. Examples of memory 930 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and refers to any suitable device operable to receive input for server 150, send output from server 150, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

In particular embodiments, processing circuitry 920 in communication with transceiver 910 receives a radio coverage report from a wireless device, determines network radio coverage information using the received radio coverage report, and sends the determined network radio coverage information to a wireless device.

Other embodiments of the server may include additional components (beyond those shown in FIG. 9A) responsible for providing certain aspects of the server's functionality, including any of the functionality described above and/or any additional functionality (including any functionality necessary to support the solution described above).

FIG. 9B is a block diagram illustrating example components of a server 150. The components may include receiving module 950, determining module 952, and transmitting module 956.

Receiving module 950 may perform the receiving functions of network node 120. For example, receiving module 950 may receive a radio coverage report from a wireless device according to any of the examples or embodiments described above (e.g., step 612 of FIG. 6). In certain embodiments, receiving module 950 may include or be included in processing circuitry 920. In particular embodiments, receiving module 950 may communicate with determining module 952 and transmitting module 956.

Determining module 952 may perform the determining functions of network node 120. For example, determining module 952 may determine network radio coverage information using the received radio coverage report according to any of the embodiments or examples described above (e.g., step 614 of FIG. 6). In certain embodiments, determining module 952 may include or be included in processing circuitry 920. In particular embodiments, determining module 952 may communicate with receiving module 950 and transmitting module 956.

Transmitting module 956 may perform the transmitting functions of network node 120. For example, transmitting module 956 may transmit the determined network radio coverage information to a wireless device or a server node according to any of the examples or embodiments described above (e.g., steps 616 and 618 of FIG. 6). In certain embodiments, transmitting module 956 may include or be included in processing circuitry 920. In particular embodiments, transmitting module 956 may communicate with receiving module 950 and determining module 952.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CRS Cell Specific Reference Signal
CSI-RS Channel State Information Reference Signal
D2D Device to Device
DL Downlink
eNB eNodeB
FDD Frequency Division Duplex
IoT Internet-of-Things
LTE Long Term Evolution
M2M Machine to Machine
MCS Modulation and Coding Scheme
MIMO Multi-Input Multi-Output
MTC Machine Type Communication
NR New Radio
OFDM Orthogonal Frequency Division Multiplex
OOS Out Of Synchronization
PLMN Public Land Mobile Network
RAN Radio Access Network
RAT Radio Access Technology
RB Resource Block
RBS Radio Base Station
RE Resource Element
RLF Radio Link Failure
RNC Radio Network Controller
RRC Radio Resource Control
RRH Remote Radio Head
RRU Remote Radio Unit
RSRP Reference Signal Received Power
RSRQ Reference Signal Received Quality
RS-SINR Reference Signal Signal-to-Interference-plus-Noise Ratio
SC-FDMA Single Carrier-Frequency Division Multiple Access
SS System Synchronization
TDD Time Division Duplex
UAV Unmanned Aerial Vehicle
UE User Equipment
UL Uplink
URLLC Ultra-Reliable Low Latency Communication
UTM UAV Traffic Management
UTRAN Universal Terrestrial Radio Access Network
WAN Wireless Access Network

The invention claimed is:

1. A method in a wireless device for use in a radio network, the method comprising:
reporting radio coverage information to a network element;
receiving network radio coverage information from a network element, the network radio coverage information comprising:
a maximum altitude above which the wireless device should not include in the determined path of travel; and
one or more geographic locations where a radio link quality is below a threshold quality, which network radio coverage report is determined by the network element using the reported radio coverage information and one more other radio coverage reports received by the network element; and
determining a path of travel for the wireless device using the received network radio coverage information.

2. The method of claim 1, further comprising controlling the wireless device to follow the determined path of travel.

3. The method of claim 1, wherein reporting radio coverage information comprises reporting a geographic path from when a radio link failure occurs to when the wireless device reconnects to the radio network.

4. The method of claim 3, wherein the reported geographic path comprises a series of periodically sampled geographic location points.

5. The method of claim 1, wherein reporting radio coverage information comprises reporting one or more geographic locations where a received radio link quality is lower than a threshold quality.

6. The method of claim 1, wherein reporting radio coverage information comprises periodically reporting a received radio link quality and associated geographic location information.

7. The method of claim 1, wherein the network radio coverage information comprises one or more geographic locations and associated radio link quality.

8. The method of claim 1, wherein determining the path of travel comprises avoiding geographic locations with a radio link quality below a threshold quality.

9. The method of claim 1, wherein the wireless device comprises an unmanned aerial vehicle.

10. A wireless device for use in a radio network, the wireless device comprising processing circuitry configured to:
report radio coverage information to a network element;
receive network radio coverage information from a network element, the network radio coverage information comprising:
a maximum altitude above which the wireless device should not include in the determined path of travel; and
one or more geographic locations where a radio link quality is below a threshold quality, which network radio coverage report is determined by the network element using the reported radio coverage information and one more other radio coverage reports received by the network element; and
determine a path of travel for the wireless device using the received network radio coverage information.

11. A method in a network element for use in a radio network, the method comprising:
receiving a first radio coverage report from a first wireless device;
determining network radio coverage information using the received first radio coverage report and one more other received radio coverage reports, wherein the determined network radio coverage information comprises:
a maximum altitude above which the wireless device should not include in a path of travel; and
one or more geographic locations where a radio link quality is below a threshold quality; and sending the determined network radio coverage information to a wireless device.

12. The method of claim 11, further comprising receiving a second radio coverage report from a second wireless device and wherein determining network radio coverage information comprises determining network radio coverage information using the first radio report and the second radio report.

13. The method of claim 11, wherein the first radio coverage report comprises a geographic path from a location where the first wireless device experiences a radio link failure to a location where the first wireless device reconnects to the radio network.

14. The method of claim 13, wherein the geographic path comprises a series of periodically sampled geographic location points.

15. The method of claim 11, wherein the first radio coverage report comprises one or more geographic locations where a received radio link quality for the first wireless device is lower than a threshold quality.

16. The method of claim 11, wherein receiving the first radio coverage report comprises periodically receiving a received radio link quality and associated geographic location information for the first wireless device.

17. The method of claim 11, wherein the determined network radio coverage information comprises one or more geographic locations and associated radio link quality.

18. The method of claim 11, further comprising sending the determined network radio coverage information to an unmanned aircraft traffic management system.

19. A network element for use in a radio network comprising processing circuitry, the processing circuitry operable configured to:
  receive a first radio coverage report from a first wireless device;
  determine network radio coverage information using the received first radio coverage report and one more other received radio coverage reports, the determined network radio coverage information comprising:
    a maximum altitude above which the wireless device should not include in a path of travel; and
    one or more geographic locations where a radio link quality is below a threshold quality; and
  send the determined network radio coverage information to a wireless device.

* * * * *